United States Patent
Taborelli

(10) Patent No.: US 10,877,458 B2
(45) Date of Patent: Dec. 29, 2020

(54) COLLISION PROTECTION METHOD IN A MACHINE TOOL COMPRISING A COMPUTER NUMERICAL CONTROL

(71) Applicant: Agie Charmilles SA, Losone (CH)

(72) Inventor: Marco Taborelli, Villa Guardia (IT)

(73) Assignee: Agie Charmilles SA

( * ) Notice: Subject to any disclaimer, the term of this patent is extended or adjusted under 35 U.S.C. 154(b) by 0 days.

(21) Appl. No.: 16/407,483

(22) Filed: May 9, 2019

(65) Prior Publication Data

US 2019/0377316 A1    Dec. 12, 2019

(30) Foreign Application Priority Data

Jun. 6, 2018 (EP) ..................... 18176206

(51) Int. Cl.
  *G05D 3/12* (2006.01)
  *G05B 19/19* (2006.01)
  *G05B 9/02* (2006.01)

(52) U.S. Cl.
  CPC .............. *G05B 19/19* (2013.01); *G05B 9/02* (2013.01); *G05B 2219/37237* (2013.01);
  (Continued)

(58) Field of Classification Search
  CPC ...................................................... G05D 3/12
  (Continued)

(56) References Cited

U.S. PATENT DOCUMENTS 4,489,377 A * 12/1984 Mawyer ............. G05B 19/4061
                                                                   318/565
2001/0012973 A1    8/2001 Wehrli et al.
(Continued)

FOREIGN PATENT DOCUMENTS

CN    102749886 A * 10/2012 ............. G05B 15/02
EP    0 676 254 A1    10/1995
(Continued)

OTHER PUBLICATIONS

Schumann et al, A Real-Time Collision Prevention System for Machine Tools, 2013, SciVerse ScienceDirect, pp. 6 (Year: 2013).*
(Continued)

*Primary Examiner* — Suresh Suryawanshi
(74) *Attorney, Agent, or Firm* — Harness, Dickey & Pierce, P.L.C.

(57) ABSTRACT

The present invention is directed to a method for mitigation of the damages in case of accidental collisions in a machine tool comprising a computer numerical control (CNC) and a plurality of axes, wherein the occurrence of collisions is monitored, comprises: identifying a first axis being an axis at which a collision is first detected, identifying a second axis being an axis parallel to said first axis, and determining if both or one or none of the axes are resting. If both are resting unlocking the first axis or both axes. If the first axis or second axis is not resting, then the moving axis is defined as the collider, and said moving axis is braked, and simultaneously the resting axis is unlocked or stepped away or held in position. If both axes are moving, defining a collider axis based on said identified first axis at which a collision has been first detected, braking said collider axis and simultaneously unlocking or stepping away the axis parallel to said collider axis.

15 Claims, 5 Drawing Sheets

(52) U.S. Cl.
CPC ............. *G05B 2219/37622* (2013.01); *G05B 2219/37624* (2013.01); *G05B 2219/37629* (2013.01)

(58) Field of Classification Search
USPC ........................................................ 700/302
See application file for complete search history.

(56) References Cited

U.S. PATENT DOCUMENTS

| | | |
|---|---|---|
| 2011/0014001 A1 | 1/2011 | Takahashi |
| 2012/0221137 A1* | 8/2012 | Kettemer ........... G05B 19/4061 700/108 |
| 2013/0103180 A1* | 4/2013 | Tolkmitt ............ G05B 19/4061 700/114 |
| 2015/0039122 A1* | 2/2015 | Barakchi Fard ....... G05B 19/19 700/186 |
| 2017/0322540 A1* | 11/2017 | Kakumoto ........... H02H 7/0851 |
| 2018/0138783 A1 | 5/2018 | Taborelli |

FOREIGN PATENT DOCUMENTS

| | | | | |
|---|---|---|---|---|
| EP | 3 151 069 A2 | 4/2017 | | |
| GB | 2 334 226 A | 8/1999 | | |
| JP | 2012226749 A * | 11/2012 | ............. | G05B 15/02 |
| WO | WO-2007-003664 A1 | 1/2007 | | |
| WO | WO-2014132846 A1 * | 9/2014 | ......... | G05B 19/4061 |

OTHER PUBLICATIONS

Extended European Search Report for Application No. EP 18 17 6206 dated Nov. 23, 2018 (9 pages).

\* cited by examiner

COLLISION PROTECTION METHOD IN A MACHINE TOOL COMPRISING A COMPUTER NUMERICAL CONTROL

CROSS-REFERENCE TO RELATED APPLICATIONS

This application claims the benefit and priority of European Application No. 18 176 206.3, filed Jun. 6, 2018. The entire disclosure of the above application is incorporated herein by reference.

BACKGROUND

The invention discloses a method to mitigate the damages in case of accidental collisions with machine tools, in particular wire electrical discharge machines.

FIELD OF THE INVENTION

A problem with machine tools, manipulators and other devices with one or more positioning axes is the risk of accidental collision, that is, a collision between parts of the machine with other machine parts or workpiece or clamping means or other part. A collision may determine a significant damage to the machine and interruption of operation. Several active, passive, preventive and reactive protection methods and devices have therefore been developed and are known in the art. The present invention discloses a reactive method, in which a collision event is detected and appropriate action is taken to avoid or limit the damages.

In the art is known to execute an emergency braking when a collision event is detected. The emergency braking is executed by either inverting the motor current to the maximum possible extent, for instance ten times the rated current, or alternatively or by short circuiting of the motor windings.

An alternative is disclosed in GB2334226A to Miles et al., which discloses an apparatus arranged to detect mechanical overload, including one or more force or strain measurement elements. In case of overload the control means controls the power supply to the machine tool which is placed in an inoperative state. Said inoperative state is achieved by an activation of the emergency stop circuitry or by activating a feed hold and spindle-stop circuit. However by activating the emergency stop circuitry as suggested in Miles the collider is not braked, so that collision may be much harder than with an emergency braking.

Patent application publication WO2007003664A1 to Garcia Angulo discloses an impact protection system for wire electrical discharge machine inlets, characterized in that the wire guiding heads are connected to the structural parts of the machine through load cells. When the monitored signal exceeds a preset value, the control of the machine controls the axes by stopping the machine or reversing the movement quickly. It understood that said reversing of the movement refers to a moving axis which will essentially be inverted, so that the axis the axis will stop and then move backwards.

With these known reactive methods the damages experienced may still be severe, because machine tools are built to be rigid, colliding masses are generally considerable, and traveling speed may also be considerable.

SUMMARY

It is an aspect of this invention to provide a method to mitigate the damages in case of accidental collisions with machine tools. In particular, it is an aspect of this invention to provide a method to mitigate the damages in case of accidental collisions with machine tools, which is sufficient and reliable.

According to an embodiment of the present invention, these objectives are achieved through the features of the independent claims. In addition, further advantageous embodiments follow from the dependent claims and the description.

According to an embodiment of the present invention, a method for mitigation of the damages in case of accidental collisions in a machine tool comprising a computer numerical control (CNC) and a plurality of axes, wherein the occurrence of collisions is monitored, comprises: identifying a first axis being an axis at which a collision is first detected, identifying a second axis being an axis parallel to said first axis, determining if both, or one, or none of the axes are resting; if it is determined that said first axis and said second axis are resting, then either only said first axis is unlocked or both, said first and second axes are unlocked; and/or, if it is determined that one of said first and second axis is resting, and that the other of said first and second axis is moving, then the moving axis is defined as the collider axis and is braked, and the resting axis is unlocked or is made to step away or is held; and/or, if it is determined that said first and said second axis are moving, then the first axis being the axis at which a collision is first detected is defined as the collider axis and is braked, and the second axis is braked or is unlocked or stepped away.

By determining if one, or both or none of the axes are at rest, an appropriate action can be taken in consideration of the specific case. In the particular case that a collision is detected while both axes are resting, the two axes are simply unlocked. Since their both velocity is null, none of them can be the collider.

In the case that a collision is detected while one of the two axes is resting, the moving axis is defined as the collider axis, and is braked. Since the second axis was resting it cannot be the collider, however, depending on the situation said resting axis is either unlocked or is made to step away or is held.

Lastly, in the case that a collision is detected while both, the first axis and the second axis were moving, then the collider is identified as the axis at which a collision is first detected. Said collider axis is braked. Depending on the situation said second axis is either braked or is unlocked or stepped away.

With both, the unlocking and the stepping away of the concordant axis the influence on the inertia of mass and the reduction of collision stiffness are positively exploited to substantially reduce the collision force. In case of the stepping away this is made actively, by a commanded displacement, whereas in case of unlocking the flight movement is due to the kinetic energy which is transmitted to the parallel axis.

In summary, a combined emergency action in case of collision is achieved by braking the collider axis and by stepping away or unlocking an axis parallel to the collider axis. There are appropriate actions to be taken with each specific axis simultaneously with the braking of the collider axis to reduce the collision stiffness and/or or to reduce the load mass to be braked, respectively to minimize the collision impact force and the machine damages in case of collision. Such appropriate actions are specific of the design of the kinematic chains of the machine and specific of each occurring collision event.

In an embodiment of the invention the collider axis and the at least one other axis are parallel to each other. In other words, the axis which is unlocked or which is made to step away is parallel to the collider axis.

An improvement of the invention is achieved by braking of the collider axis and by the simultaneously induced action with the axis which is parallel to the collider axis. However, another axis which is not parallel to the collider axis may be simultaneously unlocked or made to step away, to further relieve in case of a collision.

Thus, in another embodiment of the invention with a second axis orthogonal to the first axis being the axis at which a collision is first detected, the axis which has been identified as the collider axis is braked while, if the other axis was resting it is unlocked.

In some embodiments, the method comprises the steps described below. If it is determined that said first and said second axis are resting (velocities=0), then said first and/or said second axis are/is unlocked. If it is determined that one of said first and second axis is resting (velocity=0), and that the other of said first and second axis is moving (velocity≠0), then the moving axis is defined as the collider axis and is braked, and the resting axis is unlocked or is made to step away or is held. If it is determined that said first and said second axis are moving (velocities≠0), then the first axis being an axis at which a collision is first detected is defined as the collider axis and is braked, and the second axis is braked or is unlocked or stepped away.

With reference to this embodiment it is to be noted that, if both, the first and the second axis are moving, then it is not always possible to unequivocally determine which one of the axes was the collider axis. Additional information, in particular the direction of velocity and the design of the kinematic chains of the machine is used to finally determine the collider and consequent action to be taken.

In an embodiment of the invention the axis which is parallel to the collider axis and which is unlocked or made to step away,
is borne by the collider axis, or,
bears the collider axis, or
is opposite to the collider axis,
and said axis parallel to the collider axis is unlocked or made to step away.

"Borne" by the collider axis means, that the considered axis is in series in the same kinematic chain, that is above of the collider axis. Taking the exemplary case of FIG. 3, the column 30 which moves in Y-axis is mounted on a stationary base 12. Slide 50 which moves in V-axis is parallel to the Y-axis. In the present case the V-axis is borne by the Y-axis, vice-versa the Y-axis "bears" the V-axis.

"Opposite" to the collider axis means, that the considered axis is not mounted in the same kinematic chain of the collider axis, in other words the two axes are not mounted in series on a resting machine bed. Taking the exemplary case of FIG. 2, the table 20 which moves in X-axis is mounted on a stationary base 12. Slide 40 which moves in U-axis is parallel to the X-axis. In the present case, within the meaning of the invention the U-axis is "opposite" to the X-axis, and vice-versa.

In an embodiment of the invention the unlocking is made by interrupting the power supply of the motors which drive the one or more axis to be unlocked. The controlled axis unlocking is a suitable option for linear motors, whereas it is not advantageous in case of rotary actuators with ball-screws.

In an embodiment of the invention the stepping away is made by accelerating the axis parallel to said collider axis. In case of rotary motor with ball-screw this axis acceleration is preferably made with highest possible motor peak current value which is for instance 5 times the motor continuous current. In case of linear motor the axis acceleration is preferably made with the absolute maximum current value permitted by the motor for a short time, which is for instance 10 times the linear motor continuous rated current.

In an embodiment of the invention the stepping away direction of the axis parallel to said collider axis is determined by the direction of the velocity of the collider axis and/or by the direction of the velocity of the axis parallel to said collider axis.

In an embodiment of the invention in which one of the first axis or the second axis is not resting, the stepping away direction is determined as follows:
if the axis parallel to said collider axis is borne by the collider axis, then the stepping away of the said axis parallel to the collider axis is made:
in the collision direction, if said parallel axis is the axis at which a collision is first detected (first axis), and
against the collision direction, if said parallel axis is not the axis at which a collision is first detected
if the axis parallel to said collider axis bears the collider axis, then the stepping away of the axis parallel to said collider axis is made against the collision direction, and
if the axis parallel to said collider axis is opposite to the collider axis, the stepping away of said axis parallel to said collider axis is made in the collision direction.
In general the step away direction depends
on the configuration of the first axis and the second axis which are parallel, means, whether they are "opposite" to each other or if they belong to the same kinematic chain,
on the first axis, means the an axis at which a collision is first detected, and
on the velocities of the two axes.

In one advantageous embodiment, if the first axis and the second axis belong to the same kinematic chain and if said first axis and the second axis axes are both moving, the first axis is defined as the collider and it is braked, and that
if the absolute velocities of the first axis and the second axis have the same sign, then:
the second axis is braked if said second axis bears the first axis, or
the second axis is stepped away in the collision direction or is unlocked if said second axis is borne by the first axis; or
if the absolute velocities have opposite sign, then:
the second axis is braked if said second axis is borne by the first axis or
the second axis is stepped away in the collision direction or is unlocked if said second axis bears the first axis.

In an embodiment of the invention the stepping away is limited to a predetermined displacement value. For safety reasons the stepping away is preferably limited to a small value, e.g. less than 1 mm, for instance 100 μm, which corresponds to a typical braking distance of the axes at the maximum speed. Similarly the travel distance of an unlocked axis is preferably monitored and braking is initiated if a given distance, e.g. 1 mm or less is traversed. In this way an uncontrolled movement of the other axis, in particular risk of other collisions is limited.

To limit the peak impact force and minimize the machine damages it is fundamental to minimize the response time from the very begin of the collision event to its detection and to command an emergency braking quickest possible, once a collider part enters in contact with a collision target. Minimal response time is achieved by possibly fully embedding the collision processing algorithm with the motor electronic drive unit and/or the control unit.

In an embodiment of the invention the collider axis is braked by using known braking techniques for electrical motors, for instance an active braking. The active braking is achieved by reversing the motor current and forcing the maximum current which is tolerable by the motor. This current can be up to 10 times the motor continuous current. The maximum braking current is usually determined by the fact that the motor permanent magnets could be demagnetized by an excessive current.

In another embodiment of the invention the collider axis is braked by dynamic braking. The "dynamic" braking is achieved by shorting the motor windings. The motor is switched instantaneously to behave as asynchronous generator, converting the kinetic energy of the rotor in current and dissipating the heat generated by the winding resistance.

The active braking technique is more effective if the motor electronic drive unit (drive) is able to provide the needed high braking current. The braking efficiency achieved with the "dynamic" braking technique is still quite good, and depends on the electrical parameters of the motor as R, L and back e.m.f. constant. The braking may include a controlled step back, which means that once the axis is stopped it is retracted by a preset amount, for instance 100 µm, in order to relieve the compression.

In an embodiment, the method for mitigation of the damages according to the present invention, comprises
identifying a first axis being an axis at which a collision is first detected;
identifying a second axis, being an axis orthogonal to the said first axis;
determining if both or one or none of the axes are resting, and
if it is determined that said first and said second axis are resting, then either only said first axis is unlocked or both, said first and second axes are unlocked, and/or
if it is determined that one of said first and second axis is resting, and that the other of said first and second axis is moving, then the moving axis is defined as the collider axis and is braked, and simultaneously the resting axis is unlocked, and/or
if it is determined that said first and said second axis are moving, then said first and said second axes are braked.

In an embodiment, a monitoring circuit is applied to detect the collision. The monitoring circuit includes one or more of: a strain or force monitoring circuit, preferably including at least one piezoelectric strain sensor or strain gauge, a motor current monitoring circuit, and an axis position deviation monitoring circuit, which determines a position deviation by monitoring the differential of the effective axis position (e.g. measured with a glass scale) and the desired position (i.e. the position commanded by the control program). It is understood that said axis position deviation monitoring circuit may be realized using the axis position deviation and/or the velocity deviation and/or acceleration deviation. The collision monitoring circuit is implemented such as to provide a quickest possible and safe collision event signal. A fast collision detection is a precondition to achieve the damage mitigation.

In an embodiment of the invention the value of the velocity of the axes is determined as the first derivative of the commanded positions with respect to time, and the direction of the velocity of the axes is determined as the sign of said velocity, i.e. positive or negative.

Typically the considered axis velocity is the commanded velocity, however a measured velocity or computed velocity can be used in place of the commanded velocity.

In an embodiment of the invention the emergency action to be adopted for each specific axis of the machine tool is defined in a rules table, whereas the emergency action includes braking, holding the axis position, unlocking and stepping away.

Preferably a predefined rules table comprising the emergency actions to be adopted is predefined for all collision situations. Preferably, said rules table comprises at least the actions to be taken if two parallel axes are involved in a collision event. The rules table may however comprise certain actions to be taken by the axes which are not parallel to a colliding axis, specifically, for axis pairs being orthogonal to each other.

The rules table can be established in any form, for instance in form of a logic, and is preferably integrated with the control unit or the motor electronic drive unit. Preferably also the parameters of each action, such as e.g. a predetermined displacement value for a step away, etc. are predefined.

Considering e.g. the two parallel axes X and U of the earlier described T-base machine shown in FIG. 2, with X and U being opposite axes, a rules table comprising the suitable emergency actions for 8 specific collision situations is now illustrated:

Case where the collision is first detected on U:

| | | |
|---|---|---|
| $\vec{V}_{U_{cmd}} = 0; \vec{V}_{X_{cmd}} = 0,$ (no motion) | → unlock U, unlock X | (or: unlock U, hold X) |
| $\vec{V}_{U_{cmd}} = 0; \vec{V}_{X_{cmd}} \neq 0,$ | → step away forward U, brake X | (or: unlock U, brake X) |
| $\vec{V}_{U_{cmd}} \neq 0; \vec{V}_{X_{cmd}} = 0,$ | → brake U, step away forward X | (or brake U, unlock X) |
| $\vec{V}_{U_{cmd}} \neq 0; \vec{V}_{X_{cmd}} \neq 0,$ | → brake U, brake X | |

Case where the collision is first detected on X:

| | | |
|---|---|---|
| $\vec{V}_{U_{cmd}} = 0; \vec{V}_{X_{cmd}} = 0,$ (no motion) | → unlock U, unlock X | (or: hold U, unlock X) |
| $\vec{V}_{U_{cmd}} = 0; \vec{V}_{X_{cmd}} \neq 0,$ | → unlock U, brake X | (or: hold U, brake X) |
| $\vec{V}_{U_{cmd}} \neq 0; \vec{V}_{X_{cmd}} = 0,$ | → brake U, unlock X | (or brake U, hold X) |
| $\vec{V}_{U_{cmd}} \neq 0; \vec{V}_{X_{cmd}} \neq 0,$ | → brake U, brake X | (or: unlock U, brake X) |

Now, considering the two parallel axes Y and V of the same described T-base machine shown in FIG. 2, with Y and V belonging to the same kinematic chain, the corresponding rules table differs from the above illustrated case of the U and X axes, as follows:

Case where the collision is first detected on V:

| | |
|---|---|
| $\vec{V}_{V_{cmd}} = 0; \vec{V}_{Y_{cmd}} = 0$, (no motion) | → unlock V, unlock Y (or unlock V, hold Y) |
| $\vec{V}_{V_{cmd}} = 0; \vec{V}_{Y_{cmd}} \neq 0$, | → step away backward V, brake Y (or: hold V, brake Y) |
| $\vec{V}_{V_{cmd}} \neq 0; \vec{V}_{Y_{cmd}} = 0$, | → brake V, step away backward Y (or: brake V, hold Y) |
| $\vec{V}_{V_{cmd}} \neq 0; \vec{V}_{Y_{cmd}} \neq 0$, → | brake V, brake Y | or, for a more effective action, it is also possible discriminate according to the signs of the absolute velocities of the two axes, as follows:

| | |
|---|---|
| lets $\vec{V}_{2_{cmd}} = \vec{V}_{V_{cmd}} + \vec{V}_{Y_{cmd}}$ | the absolute velocity of the borne axis (V axis), |
| ➤ if $\vec{V}_{2_{cmd}} \cdot \vec{V}_{Y_{cmd}} > 0$, | → brake V, brake Y |
| ➤ if $\vec{V}_{2_{cmd}} \cdot \vec{V}_{Y_{cmd}} < 0$, | → brake V, step away forward Y (or brake V, unlock Y) |

Case where the collision is first detected on Y:

| | |
|---|---|
| $\vec{V}_{V_{cmd}} = 0; \vec{V}_{Y_{cmd}} = 0$, (no motion) | → unlock V, unlock Y (or hold V, unlock Y) |
| $\vec{V}_{V_{cmd}} = 0; \vec{V}_{Y_{cmd}} \neq 0$, | → step away forward V, brake Y (or: unlock V, brake Y) |
| $\vec{V}_{V_{cmd}} \neq 0; \vec{V}_{Y_{cmd}} = 0$, | → brake V, hold Y (or: brake V, unlock Y) |
| $\vec{V}_{V_{cmd}} \neq 0; \vec{V}_{Y_{cmd}} \neq 0$, | → unlock V, brake Y (or: brake V, brake Y) | or, for a more effective action, it is also possible discriminate according to the signs of the absolute velocities of the two axes, as follows:

| | |
|---|---|
| lets $\vec{V}_{2_{cmd}} = \vec{V}_{V_{cmd}} + \vec{V}_{Y_{cmd}}$ | the absolute velocity of the borne axis (V axis), |
| ➤ if $\vec{V}_{2_{cmd}} \cdot \vec{V}_{Y_{cmd}} > 0$, | → step away forward V, brake Y (or: unlock V, brake Y) |
| ➤ if $\vec{V}_{2_{cmd}} \cdot \vec{V}_{Y_{cmd}} < 0$, | → brake V, brake Y |

Notice that in the above table, the "step away" action is specified as a "forward" or "backward" step, that is in some cases the stepping away is made in the collision direction (or "forward"), and some other cases the stepping away is made against the collision direction (or "backward").

In a preferred embodiment of the invention which is suitable in case of a collision of "opposite" axes, it is provided that,
   if it is determined that said first and said second axis are resting (velocities=0), then either only said first axis is unlocked or said first and second axis are unlocked, and
   if it is determined that one of said first and second axis is resting (velocity=0), and that the other of said first and second axis is moving (velocity≠0), then the moving axis is defined as the collider axis and is braked, and the resting axis is unlocked or is made to step away forward or is held, and
   if it is determined that said first and said second axis are moving (velocities≠0), then the first axis being the axis at which a collision is first detected is defined as the collider axis and is braked, and the second axis is braked or is unlocked.

In an embodiment of the invention which is suitable in case of a collision of a pair of axes belonging to the same kinematic chain it is provided that:
   if it is determined that said first and said second axis are resting (velocities=0), then either said first axis is unlocked or said first and second axes are both unlocked, and
   if it is determined that one of said first and second axis is resting (velocity=0), and that the other of said first and second axis is moving (velocity≠0), then:
      if the first axis is resting and said first axis is borne by the second axis, then the first is stepped away backwards or is held and the second axis is braked;
      if the first axis is moving and said first axis is borne by the second axis, then both, the first and the second axes are braked;
      if the first axis is resting and said first axis bears the second axis, then the first axis is held or is unlocked and the second axis is braked;
      if the first axis is moving and said first axis bears the second axis, then the first axis is braked while the second axis is stepped away forward or is unlocked.
   if it is determined that said first and said second axis are moving (velocities≠0), then the emergency action depends by whether the first axis is borne by the second axis or whether it bears the second axis, so that there are two possible combined actions:
  if the first axis is borne by the second axis, then both, the first and second axes are braked;
  if the first axis bears the second axis, then the first axis is braked while the second axis is unlocked or stepped away forward.

For the second case illustrated here above, where it is determined that one of said first and second axis is resting (velocity=0), and that the other of said first and second axis is moving (velocity≠0), the emergency action depends by whether the first axis (axis on which collision is detected at first) is resting or is moving and whether the first axis is borne by the second axis or whether it bears the second axis, so that one of the four listed combined actions is to be adopted in case of collision.

The rules table comprises e.g. four individual emergency actions: brake, hold, unlock and stepping away, where the stepping away action is either a forward or a backward movement. "Hold" means, controlling the motor to hold the commanded axis position according to the control program, with no change provoked by the collision event. The holding of the commanded axis position is the normal condition of any axis of the CNC machine tool. Thus the "brake" action becomes a "hold" action if the concerned axis is already resting.

As can be seen the rules table may also comprise an emergency action for a collision detected with stationary axes. This may happen for instance in case of a collision generated by another axis, means an axis other than the first axis at which a collision is first detected and other than a second axis being an axis parallel to said first axis This other axis may also be an external device, such as a robot or a pallet changer. During the operation of the external device the machine axes are normally at rest, so that the collision is attributable to said external device.

The rules table has been explained with reference to a machine having a T-base as shown in the Figures. Other machine axes concepts require other emergency strategies which are predefined by means of a specific rules table of emergency strategies. It is understood that the rules table is defined for pairs of parallel axes and may include actions for orthogonal axes or for other machine axes.

The specific design of the machine axes kinematic chain and the size of the machine determines the moved masses. In an embodiment of the invention the rules table is determined by the machine axes kinematic chain.

Preferably the appropriate action to be taken for each axis is predefined by means of said rules table for the specific machine design and for the specific collision situation. The collision situation is characterized by the specific combination of collider and target, in other words, which axes are involved. In particular, if a collision event involves a pair of parallel axes (X//U, respectively Y//V) the collider axis is braked whereas the parallel axis is unlocked or stepped away or held or braked. An emergency action in which the machine axes are all braked or unlocked indiscriminately is known in the art.

Basically, the specific collision situation is identified as follows:
  determine the axis on which the collision is first detected and the axis parallel thereto;
  determine the velocities of the two parallel axes, in direction and value (if zero or non-zero).

The measures claimed by the invention to mitigate a collision consist essentially in decoupling the mass of the target or linked to the target, or in actively displacing the target, and simultaneously braking the collider axis, as described here above.

To further reduce the peak force in case of a collision, known methods can be combined with the present invention. One such known measure is to provide the mostly exposed surfaces with an elastic layer.

In a preferred embodiment the combined emergency strategies are preferably implemented with dual channel motor drives. Dual channel motor drive are available with most drive manufacturers, and can be advantageously used to drive the motors of two suitably paired, i.e. parallel or orthogonal axes and to interface their feedback devices (one or two per axis).

The advantage lies in that the dual channel drives includes a single common CPU or PLC running a SW routine dedicated to recognize a specific collision event and commanding the correlated emergency actions on both two axes, without any data transfer to other units or devices through an external communication bus that can introduce a latency. By using such integrated solution the collision detection and reaction time can be reduced to a minimum.

BRIEF DESCRIPTION OF THE DRAWINGS

In order to describe the manner in which advantages and features of the disclosure can be obtained, in the following a more particular description of the principles briefly described above will be rendered by reference to specific embodiments thereof which are illustrated in the appended drawings. These drawings depict only exemplary embodiments of the disclosure and are not therefore to be considered to be limiting of its scope. The principles of the disclosure are described and explained with additional specificity and detail through the use of the accompanying drawings in which.

DESCRIPTION

In wire electrical discharge machines (WEDM) the tool i.e. the tensioned traveling wire electrode is guided above and below of the workpiece. Basically, an upper wire guide and a lower wire guide are moved in two parallel planes above and below of a workpiece by means of the X/Y and U/V axis pairs, and a vertical Z axis serves to control the distance between the two wire guides. The wire guides serve to precisely guide the tensioned traveling wire electrode. The wire guides are moved independently in the two planes to perform a cylindrical or a conical machining of a work piece.

Generally, the axis nomenclature in machine tools is defined by ISO 841, "Industrial automation systems and integration—Numerical control of machines—Coordinate system and motion nomenclature", where X, Y and Z are linear axes where Z is aligned with the spindle (or tool) of the machine; A, B and C are rotary axes rotating around X, Y and Z respectively; and U, V and W are parallel linear axes along X, Y and Z respectively.

There are many possible variants for the design of the kinematic chain of a WEDM machine, however by definition the U-axis is parallel to the X-axis, and the V-axis is parallel to the Y-axis.

Figure 1:
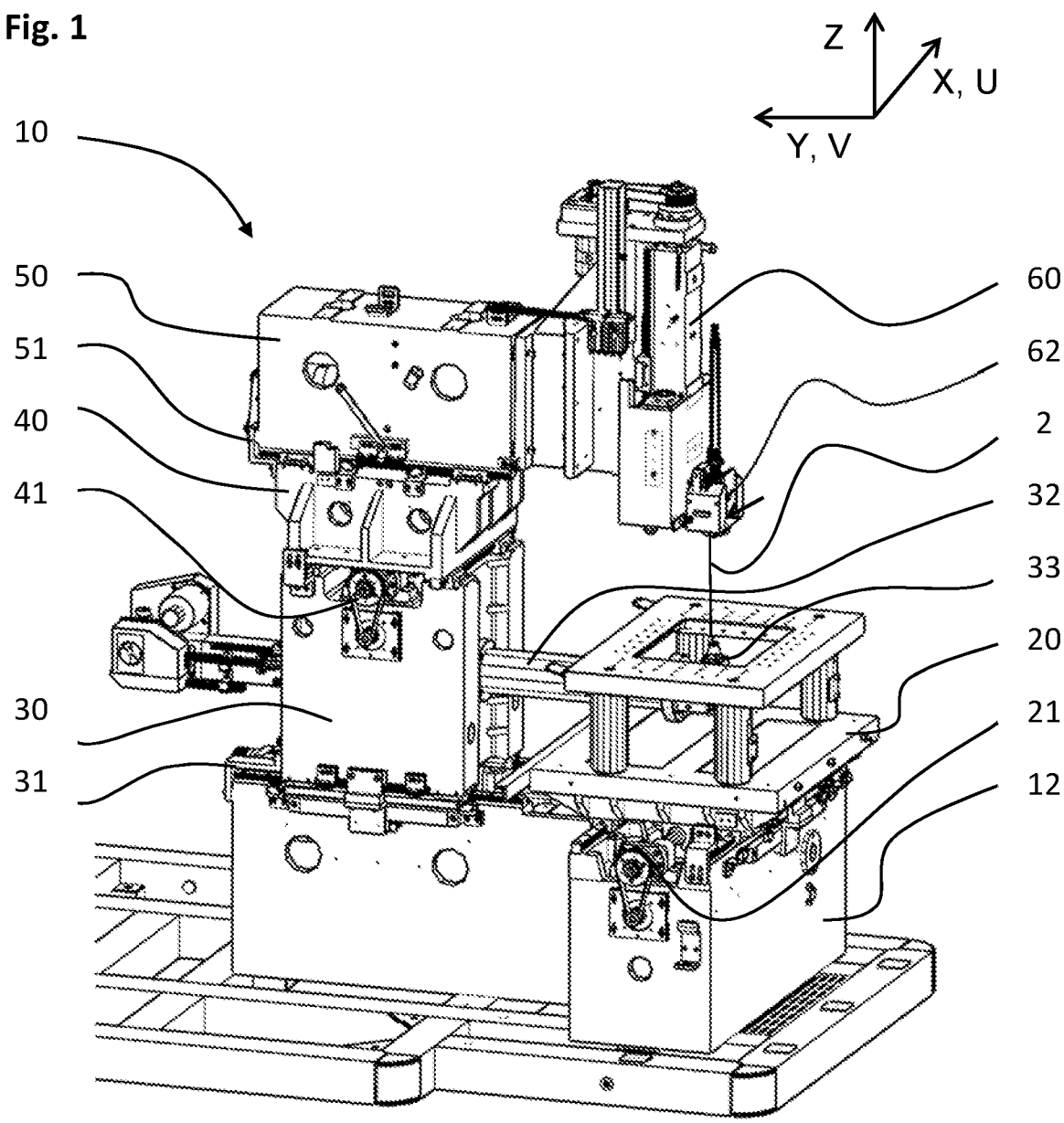
FIG. 1 illustrates the machine frame of a wire electrical discharge machine having a T-base type mechanical concept.

According to one such design variant, the machine frame 10 has a T-base design as shown in FIG. 1, in which the T-base 12 bears the X-axis 21 which moves the table 20 on which the workpiece 1 (not shown) is mounted, and the T-base 12 further bears the Y-axis 31 which bears a moving column 30. The column 30 bears in series the U-slide 40, the V-slide 50 and lastly the Z-axis 60 with the upper wire guiding head 62. A wire guiding arm 32 is mounted at the front side of the column 30. The wire guiding arm 32 bears the lower wire guiding head 33. The second pair of orthogonal axes (41, 51), U-slide 40 and V-slide 50 are mounted on the top of the moving column 30, in series to the Y-axis.

For cylindrical machining the wire electrode 2 is vertical and only X- and Y-axes are moved, i.e. the workpiece 1 moves in X-direction and the wire electrode moves in Y-direction. For taper machining the upper wire guiding head 62 is displaced relative to the lower wire guiding head 33 by means of the U- and V-axes.

The position of the vertical Z-axis is set according to the workpiece height and is generally not moved during machining.

In a machine tool accidental collisions occur sometimes at the machine setup, when a human operator moves the machine axes in manual mode. However collisions may also occur in execution of an automatic machining program, for instance if the program has not been thoroughly tested and contains errors in the trajectory, or if parts detached from a workpiece in the course of the machining remain in the working area and become an obstacle for the machine axes.

The following are some typical collision events which may occur in a WEDM machine:
- The wire guiding heads bearing respectively the upper and lower wire guides may collide against the workpiece or against other parts fixedly mounted, i.e. stationary to the table along two horizontal directions or in vertical direction.
- Solid parts separated from the workpiece such as dropout pieces may fall into the working area and may collide against the lower head or generally against the lower arm.
- Small oblong dropout pieces may drop into the nozzle aperture of the lower wire guide, and collide with the workpiece when the lower wire guiding head is moved.

The kinetic energy $E_k = \frac{1}{2} \cdot m \cdot v_c^2$ given by the load mass of the collider and by the collision speed, and further, the stiffness of the collision point, the time delay to collision detection and delay to reaction and by the braking efficiency are all determining the collision peak force and the deformation or damage of the machine. The "load mass" is the relevant mass determining the kinetic energy in case of a collision, which normally including the mass of the colliding axis and all machine parts borne by the colliding axis. This is at least partially avoided by the present invention.

In the following description, the machine part which moves in collision direction is defined as "collider" or "collider axis" and that by traveling provokes the collision, whereas the other part, i.e. the part which is hit by the collider is defined as the "collision target", "target axis" or simply "target". The role of collider and target can be assumed by either the tool-side (machining heads) or the workpiece-side.

Tool-side and/or workpiece-side are supported by a number of linear and/or rotatory axes, by which the desired number of Degrees of Freedom (DoF) is achieved.

According to the invention the occurrence of collisions is monitored, the collider axis is identified and is braked as quick as possible. Simultaneously, one other axis is unlocked or is made to step away, where this other axis is typically an axis parallel to the collider axis.

The invention takes advantage of the fact that the mechanical concept of certain multiple-axis machine tools, in particular certain wire electrical discharge machine allow a "combined emergency action", which is more effective than the traditional only braking or the feed hold command of machine axis. This possibility is determined by the fact that a WEDM comprises two pairs of parallel axes, which, according to the invention are controlled such as to reduce the effect of a collision.

One such combined emergency action to be adopted in case of a collision event basically consists in the unlocking of one or more axes while the collider axis is braked. "Unlocking" or disengaging or releasing means, eliminating substantially or at least significantly reducing the linkage between the stationary and the moved part of an axis. This linkage is typically a force linkage determined by the motor and/or transmission chain. Here the unlocking is made by interrupting the power supply to the motor of the axis to be unlocked. This produces two effects:
- a reduction of the collision stiffness, if the target is supported by the unlocked axis;
- a reduction of the load mass to be braked, if by unlocking the a part of the collider mass is uncoupled.

The scope and advantages achieved by the uncoupling is explained, by way of example, with reference to a wire EDM machine having a "T-base" mechanical concept illustrated in the Figures.

Figure 2:
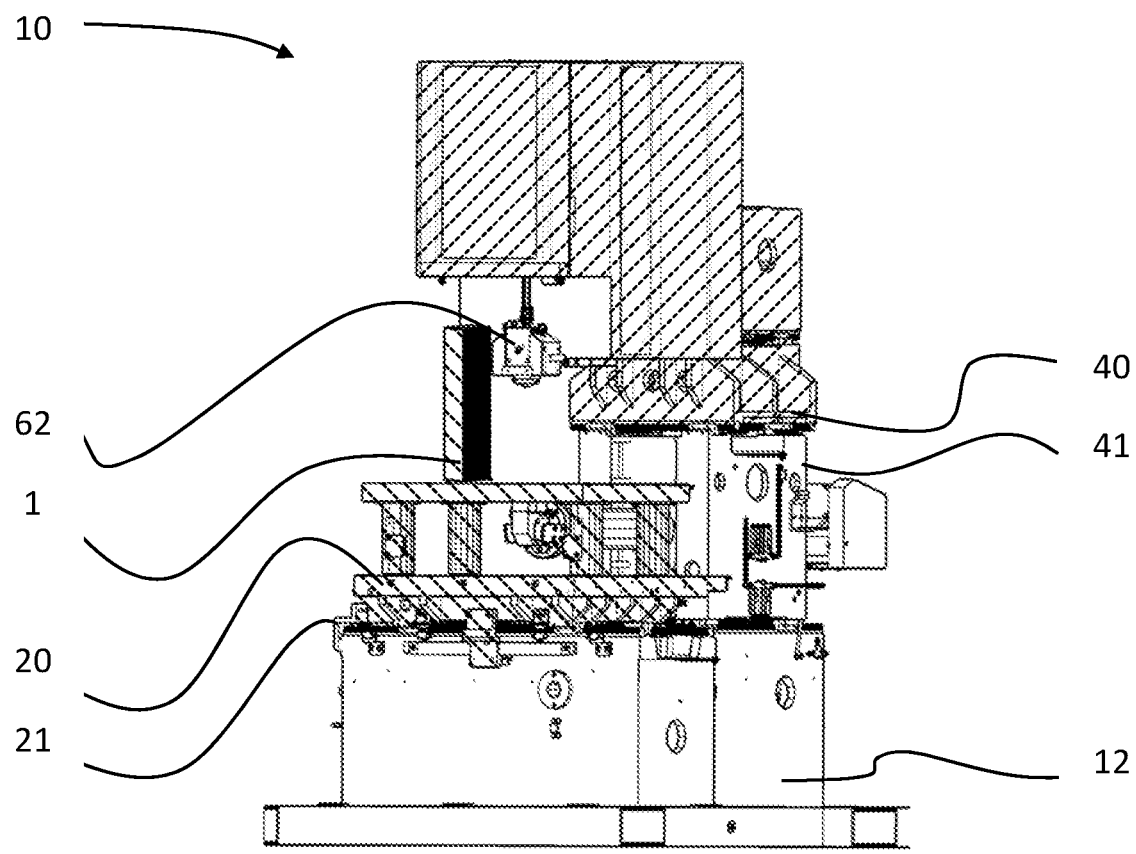
FIG. 2 illustrates a collision between workpiece and upper wire guiding head.
Figure 3:
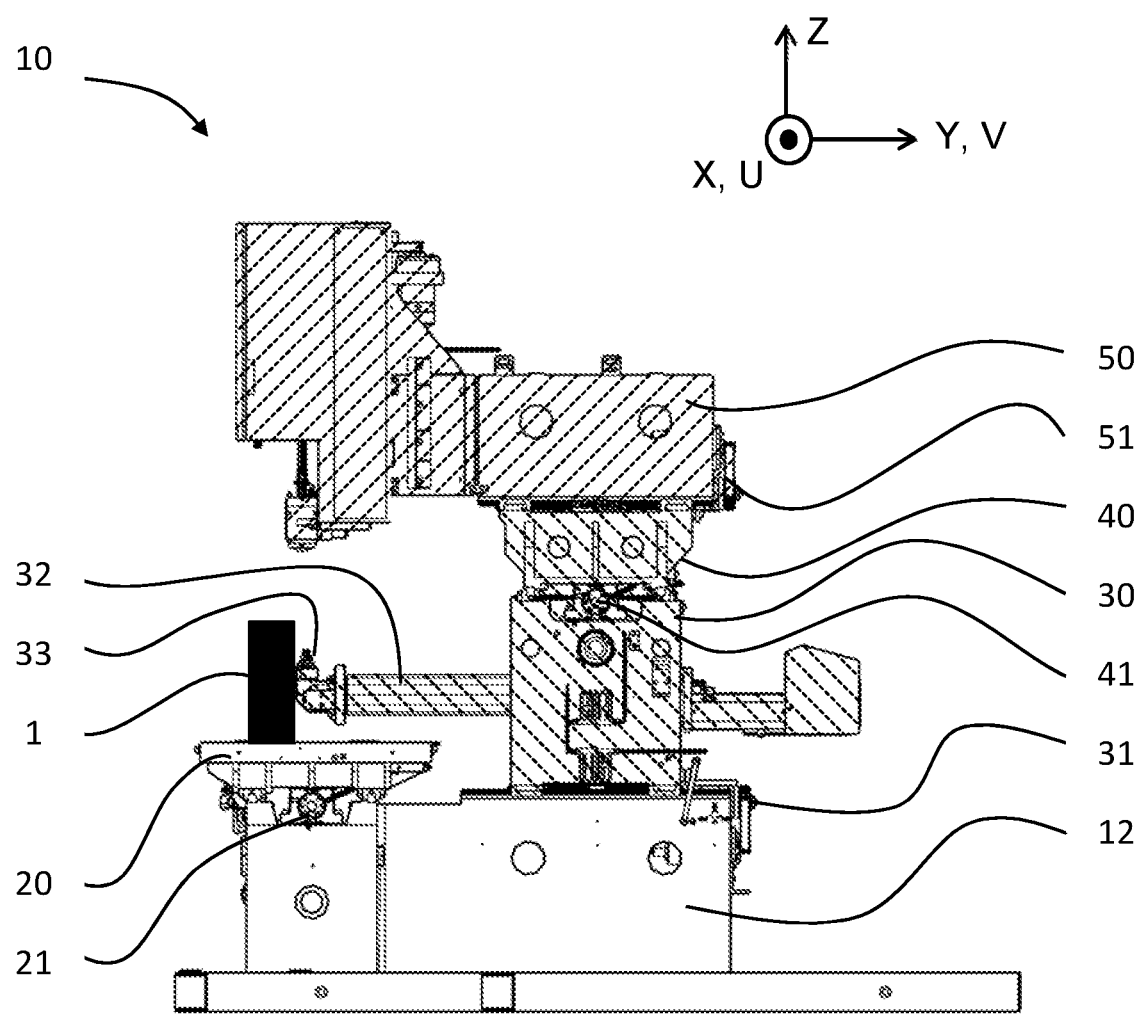
FIG. 3 illustrates a collision between workpiece and lower wire guiding head.

FIGS. 2 and 3 illustrate two examples of collision events in which a combined emergency action according the invention, including the simultaneous braking of the collider axis and the unlocking of another axis which is parallel to the collider axis leads to the two described advantageous effects.

FIG. 2 is referred to the case of a collision of a tall workpiece 1 against the left side of the upper head 62 while the X-axis 21 moves to the right.

The U-axis 41 is stationary, which means that the machine is doing a cylindrical machining or an X/Y axis positioning.

Here a combined emergency action consists in braking the X-axis, that is the collider (which is highlighted in FIG. 2 with descending hatch), and to simultaneously unlock the U-axis 41, that is the target, (highlighted with ascending hatch). In this way the collision stiffness and the impact peak force are drastically reduced.

However the unlocking of the U-axis 41 is only advantageous if the unlocked axis can freely move which is the case if the axis is driven by a linear motor, whereas it is not advantageous if the axis is driven by a ball-screw, since the screw is generally self-locking, thus preventing the axis translation.

In case of ball-screw driven axis the linkage may be interrupted by providing mechanical locking/unlocking means within the transmission chain, such as a safety clutch. However this embodiment would require a safety clutch for each axis, which needs additional space. Moreover it would increase the cost of the machine. Further it reduces the stiffness of the transmission chain. Lastly a mechanical locking/unlocking means may result in a delayed decoupling which is not acceptable, so that such variant is excluded.

In this case, a third type of emergency action can be commanded, that is a "stepping away". "Stepping away" means, executing a sudden escape movement with the highest possible acceleration. The stepping away is limited in distance, such as to achieve a limited final displacement of typically few hundreds of microns, which is the range of the collider braking distance. By a combination of braking of the X-axis 21 and stepping-away of the U-axis 41 to the right, the collision stiffness and the impact peak force are greatly reduced. Of course, "stepping away" can be used also in case of axis driven by linear motors.

As said, if the X-slide is the collider which collides against the resting U-axis representing the target, then X-axis is braked and the U-axis is unlocked or stepped away. Vice-versa, if the U-slide is the collider and the X-axis is the resting target, then X-axis is unlocked or stepped away and the U-axis is braked. Once the collision is detected at either the X- or the U-axis, these two different collision events can be easily recognized by determining the direction and value of the velocities. As explained above, the first time derivative of the positions represents the value of the velocities, and the sign of the velocity reflects the direction of motion.

FIG. 3 illustrates a collision of the front side of the lower head 33 against the workpiece 1. Here the Y-axis 31 moves to the left at velocity $\vec{v}_y = \vec{v}_1$ and collided against the workpiece 1 which is clamped on the stationary table 20. The V-axis 51 is also resting with respect to the column 30, i.e. $v_r=0$, holding its position. But since the V-axis 51 (highlighted in FIG. 3 with ascending hatch /) is supported by Y-axis 31, said V-axis and said Y-axis moves at the same absolute velocity of Y, i.e. $\vec{v}_2 = \vec{v}_1$. In other words, the relative velocity of the V-axis $v_r=0$, but its absolute velocity is not zero.

Here a combined emergency action is to brake the Y-axis 31, that is the collider, (highlighted with descending hatch \), and to simultaneously unlock the V-axis 51 (highlighted in FIG. 3 with ascending hatch /), since the V-axis is supported by the Y-axis. In this way the mass to be braked is significantly reduced, from 600 to 350 kg.

If opposite hereto, with such a collision the V-axis remains in a "hold position" state, then the control reacts by feeding the required motor current, such as to maintain the entire mass linked to the V-axis 51 (250 kg, highlighted with ascending hatch /) rigid with the mass of the column 30 (350 kg, highlighted with descending hatch \). By unlocking the V-axis 51 according to the invention, its mass continues to slide by inertia at an initial velocity $\vec{v}_2 = \vec{v}_1$ and decelerates only due to friction, until it stops.

Therefore, by adopting a combined emergency action of simultaneously braking and unlocking for Y/V, the mass to be braked is reduced to e.g. less than 50%, and the impact force is reduced by the same factor. Thus only a fraction of the Y-axis kinetic energy is to be absorbed by braking.

For the case of this FIG. 3, stepping away, means, accelerating the V-axis in the same direction of the colliding Y-axis can replace the unlocking of the V-axis 51. In fact, according to the action and reaction law, a forward thrust for the upper mass of the V-slide 50 requires to be supported by an opposite thrust, backwards for the lower mass of the Y-slide 30. The forward trust generated by the acceleration the V-axis 51 in the same direction of the colliding Y-axis acts against the forward movement of column 30 and U-slide 40. In this way a more effective braking for the Y-axis is achieved.

According the invention the second axis may be an axis orthogonal to the first axis, the first axis being the axis at which a collision is first detected. The axis which has been identified as the collider axis is braked while the other axis is unlocked.

In fact, although many collisions are uniaxial, the force components are at the very most tri-axial. Thus in certain conditions is advantageous to disengage an axis which is normal to the direction of the detected collision. For instance, referring to the case depicted in FIG. 3, let us assume that the workpiece 1 is cylindrical and the lower wire guiding head 33 collides with the workpiece in Y-direction. Since the V-axis 51 is parallel to the colliding Y-axis 31, the V-axis is either unlocked or made to step away. Additionally, if the X-axis is unlocked, the table 20 may escape due to the collision force component in X-direction, contributing to relieve the collision. More generally, the other axis may be a linear axis at an angle with respect to the collider axis. Here, this other axis can execute a relieving movement along the parallel component, by the stepping away. This embodiment is also applicable to a wire electrical discharge machine having independently controlled upper and lower wire guiding heads, such as the "Quadrax" concept by GF Machining Solutions. With the Quadrax each of the upper and lower wire guiding heads is borne by an orthogonal axis pair, respectively mounted above and below of a stationary traverse.

The same applies to a rotary axis; a collision point can be relieved, for instance by rotating the target away from the collider. However such emergency action implies a certain risk; consequences of unlocking or stepping away must be analyzed for each specific case. If an unlocking or a stepping away with the at least one other axis is not safe, then this axis is preferably braked in known manner or hold in its position.

The diagrams shown in the FIG. 4 to FIG. 7 illustrate the progression of the collision force over the time after the detection of a collision. All these diagrams represent the respective collision force starting from a detection time t=0, at which the force has reached a threshold of 200N. These diagrams have been computed by means of a model for a respective collision case. The FIGS. 4 and 6 refer to linear motor driven axes, whereas the FIGS. 5 and 7 refer to axes driven by a rotary motor with ball-screw.

Figure 4:
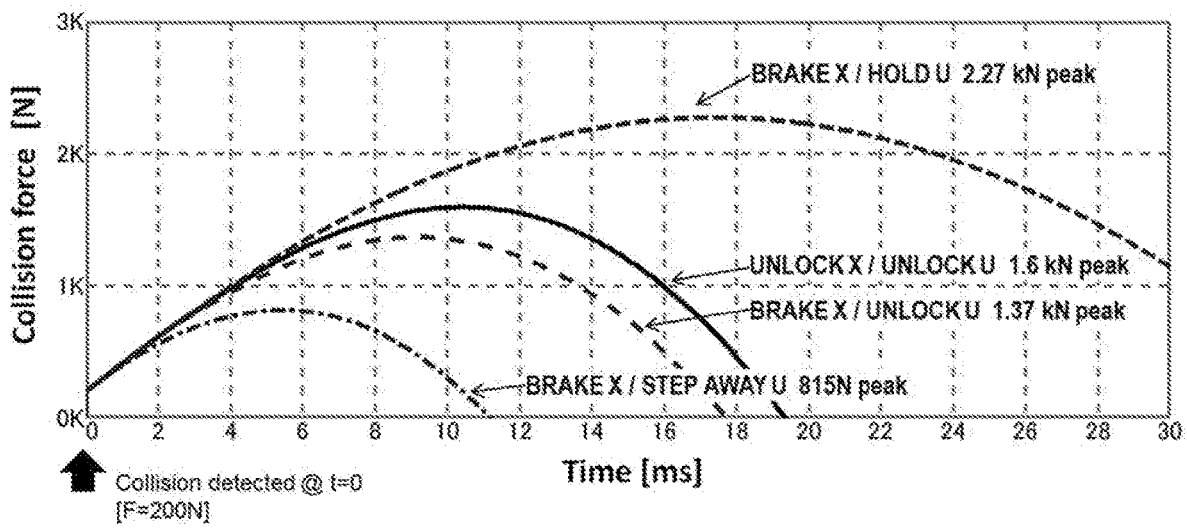
FIG. 4 to FIG. 7 illustrate the progression of the force over the time after the detection of a collision.

In particular, FIG. 4 illustrates a diagram in which four possible combined emergency actions are compared in terms of collision force, for the collision case of FIG. 2, involving a pair of "opposite" parallel axes X and U, whereas said axes are driven by linear motors. The considered collision speed is at a maximum fast positioning speed of $v_X=3.0$ m/min for the X-axis (the collider) while the U-axis is resting, i.e. $v_U=0$ (case of cylindrical machining). The stiffness of the collision point is 4.5 N/μm, whereas this stiffness reflects both stiffnesses, the one of the collider and the one of the target. FIG. 4 illustrates the four cases:

unlocking X and unlocking U
braking X and holding U
braking X and unlocking U
braking X and stepping away U In this model the braking current or stepping current have been set to the absolute maximum current value permitted by the motor for brief time interval, which here is assumed to be 10 times the linear motor continuous rated current.

As shown in the graph the unlocking or stepping away of the target axis (U) allows to decrease the collision stiffness and thus significantly reduce the impact peak force.

Figure 5:
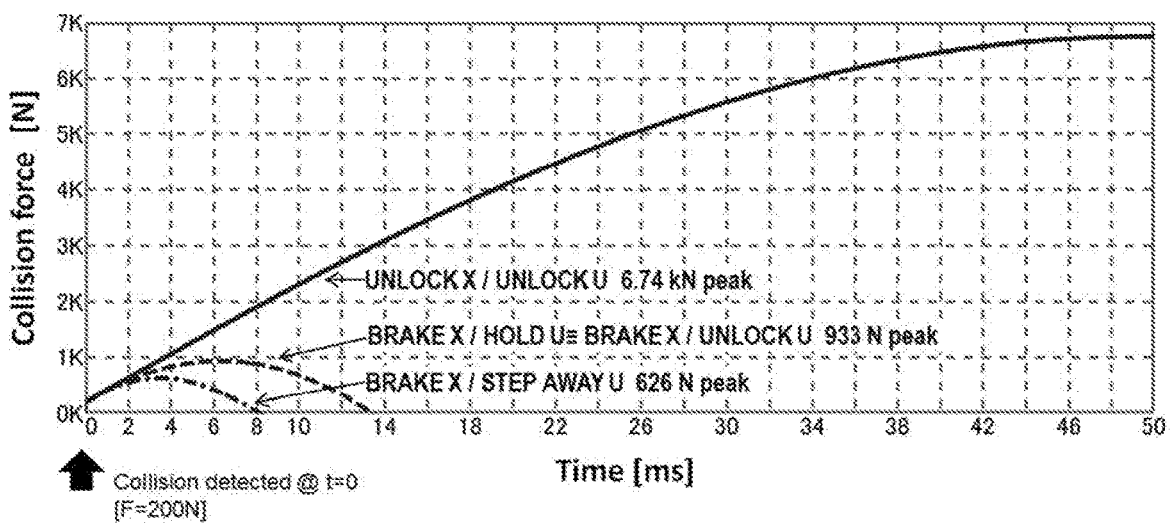

FIG. 5 illustrates a diagram in which three possible combined emergency actions are compared in terms of collision force, still for the collision case of FIG. 2, involving a pair of "opposite" parallel axes X and U, whereas said axes are driven by a rotary motors plus a mechanical transmission including pulleys (reduction ratio 4:1) and ball-screws. The considered collision speed is at a maximum fast positioning speed of $v_X$=3.0 m/min for the X-axis (the collider) while U-axis is resting, i.e. $v_U$=0 (case of cylindrical machining). The stiffness of the collision point is 4.5 N/μm. FIG. 5 illustrates the three cases:

unlocking X and unlocking U
braking X and holding U
braking X and stepping away U In this model the braking current or stepping current have been set to the motor nominal peak current, means about 5.5 times the motor continuous current.

Notice the huge peak force for the action "Unlock X/Unlock U". This is due to the very high kinetic energy stored in the motor rotor plus mechanical transmission (pulleys and ball-screws), which is about four times the kinetic energy of the translating mass.

For the case of rotary motors with ball-screw it is thus not advisable to unlock the axes pair. The best action to be taken here to achieve a possibly low peak force is "Brake X/Step away U". Second best action here is the action "Brake X/Unlock U". The action "Brake X/Unlock U" is nearly equivalent to the action "Brake X/Holding U" (not shown) since, when the axis is unlocked, the flight movement is still hindered by the small helix angle of the ballscrew.

Figure 6:
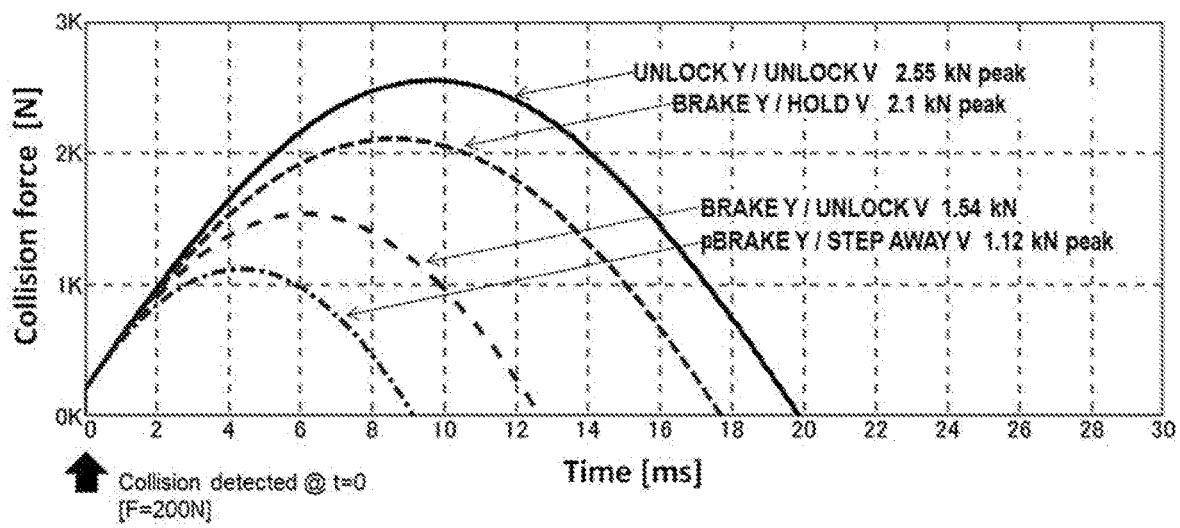

FIG. 6 illustrates a diagram in which four possible combined emergency actions are compared in terms of collision force, now for the collision case of FIG. 3, involving a pair of parallel axes Y and V, belonging to the same kinematic chain (V is borne by Y), whereas said axes are driven by linear motors. The considered collision speed is the maximum fast positioning speed of $v_Y$=3.0 m/min for the Y-axis (the collider) while V-axis is resting, i.e. $v_V$=0 (case of cylindrical machining). The stiffness of the collision point is 8 N/μm. FIG. 6 illustrates the four cases:

Unlocking Y and Unlocking V
Braking Y and Holding V
Braking Y and Unlocking V
Braking Y and Stepping away V In this model the braking current or stepping current have been set to the absolute maximum current value permitted by the motor for brief time interval, which here is assumed to be 10 times the linear motor continuous rated current.

By unlocking the borne axis (V) while the bearing axis (Y) is braked, the mass to be braked is significantly reduced. On the other hand, by stepping away the borne axis (V) in the collision direction while the bearing axis (Y) is braked, the mass to be braked is reduced, and braking is further enhanced by stepping forward the borne axis in collision direction, which generates a backward trust on the bearing axis (Y), determining an even lower peak force.

Figure 7:
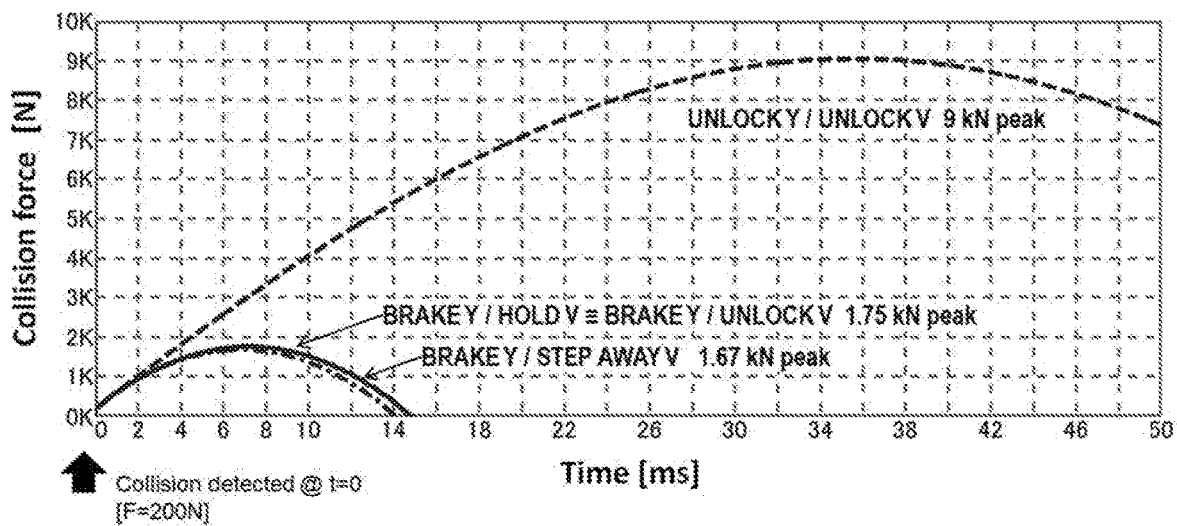

FIG. 7 illustrates a diagram in which three possible combined emergency actions are compared in terms of collision force, still for the collision case of FIG. 3, involving a pair of parallel axes Y and V, belonging to the same kinematic chain (V is borne by Y), whereas said axes are driven by rotary motors plus a mechanical transmission including pulleys (reduction ratio 4.1) and ball-screws.

FIG. 7 illustrates the three cases:
Unlocking Y and Unlocking V
Braking Y and Holding V
Braking Y and Stepping away V In this model the braking current or stepping current have been set to the motor nominal peak current, means about 5.5 times the motor continuous current.

Notice the huge peak force for the action "Unlock Y/Unlock V". This is due to the very high kinetic energy stored in the motor rotor plus mechanical transmission (pulleys and ball-screws), which is about eight times the kinetic energy of the translating mass.

In this case, the stepping away of the borne axis (V) in the collision direction while the bearing axis (Y) is braked does not produce a significant improvement with respect to the action "Brake Y/Unlock V" or "Brake Y/Hold V". This is due to the fact that the main part of the kinetic energy is stored in the rotary motor and mechanical transmission rather than in the translating axis slider.

Also, unlocking the borne axis is substantially same as holding it, since it cannot execute an unhindered backward displacement due to the small helix angle of the ball-screw.

The diagrams confirm that:
a combined simultaneous action with the first and the second axis provides a substantial reduction of the collision peak force;
a combined simultaneous action in which the collider is braked and the other axis is unlocked leads to an substantial improvement, however stepping away the other axis is even better.
rotary and linear drives behave completely differently and require different actions; unlocking is not applicable to a ball-screw actuated axis, thus here, if any, stepping away is to be adopted.

The invention claimed is:

1. A method for a mitigation of damages in case of accidental collisions in a machine tool comprising a computer numerical control (CNC) and a plurality of axes, wherein an occurrence of collision is monitored, the method comprising:
identifying a first axis being an axis at which a collision is first detected;
identifying a second axis being an axis parallel to said first axis;
determining if both or one or none of the axes are resting, and
if it is determined that said first and said second axis are resting, then either only said first axis is unlocked or both, said first and second axes are unlocked, or
if it is determined that one of said first and second axis is resting, and that the other of said first and second axis is moving, then the moving axis is defined as the collider axis and is braked, and simultaneously the resting axis is unlocked or is made to step away or is held, or
if it is determined that said first and said second axis are moving, then the first axis is defined as the collider axis and is braked, and simultaneously the second axis is braked or is unlocked or stepped away.

2. The method for the mitigation of damages in case of accidental collisions, according to claim 1, wherein the axis parallel to the collider axis,
is borne by the collider axis, or
bears the collider axis, or
is opposite to the collider axis,
and that said axis parallel to the collider axis is unlocked or made to step away or is held or braked.

3. The method for the mitigation of damages in case of accidental collisions, according to claim 1, wherein unlocking is made by interrupting the power supply of the motors which drive the one or more axis to be unlocked.

4. The method for the mitigation of damages in case of accidental collisions, according to claim 1, wherein the stepping away is made by accelerating the axis parallel to said collider axis.

5. The method for the mitigation of damages in case of accidental collisions, according to claim 1, wherein the stepping away direction of the axis parallel to said collider axis is determined by the direction of the velocity of the collider axis and/or by the direction of the velocity of the axis parallel to said collider axis.

6. The method for the mitigation of damages in case of accidental collisions, according to claim 1, wherein if one of the first axis and the second axis is not resting, then the stepping away direction is determined as follows:
if the axis parallel to said collider axis is borne by the collider axis, then the stepping away of the said axis parallel to said collider axis is made:
in the collision direction, if said parallel axis is the axis at which a collision is first detected, or
against the collision direction, if said parallel axis is not the axis at which a collision is first detected, or
if the axis parallel to said collider axis bears the collider axis, then the stepping away of said axis parallel to said collider axis is made against the collision direction, or
if the axis parallel to said collider axis is opposite to the collider axis, then the stepping away of said axis parallel to said collider axis is made in the collision direction.

7. The method for the mitigation of damages in case of accidental collisions, according to claim 1, wherein if the first axis and the second axis belong to the same kinematic chain and if said first axis and the second axis axes are both moving:
the first axis is defined as the collider and it is braked, and that
if the absolute velocities of the first axis and the second axis have the same sign, then:
the second axis is braked if said second axis bears the first axis, or
the second axis is stepped away in the collision direction or is unlocked if said second axis is borne by the first axis; or
if the absolute velocities have opposite sign, then:
the second axis is braked if said second axis is borne by the first axis or
the second axis is stepped away in the collision direction or is unlocked if said second axis bears the first axis.

8. The method for the mitigation of damages in case of accidental collisions, according to claim 1, wherein the stepping away is limited to a determined displacement value.

9. The method for the mitigation of damages in case of accidental collisions, according to claim 1, wherein the collider axis is braked
by reversing the motor current, or
by shorting the windings of the motor phases.

10. A method for mitigation of damages in case of accidental collisions in a machine tool comprising a computer numerical control (CNC) and a plurality of axes, wherein an occurrence of collision is monitored, the method comprising:
identifying a first axis being an axis at which a collision is first detected;
identifying a second axis, being an axis orthogonal to the said first axis;
determining if both or one or none of the axes are resting, and
if it is determined that said first and said second axis are resting, then either only said first axis is unlocked or both, said first and second axes are unlocked, or
if it is determined that one of said first and second axis is resting, and that the other of said first and second axis is moving, then the moving axis is defined as the collider axis and is braked, and simultaneously the resting axis is unlocked, or
if it is determined that said first and said second axis are moving, then said first and said second axes are braked.

11. The method for the mitigation of damages in case of accidental collisions, according to claim 10, wherein a monitoring circuit configured to determine a collision includes one or more of:
a strain or force monitoring circuit,
a motor current monitoring circuit,
an axis position deviation monitoring circuit.

12. The method for the mitigation of damages in case of accidental collisions, according to claim 10, wherein the axes of the machine tool are controlled pairwise by a dual channel drive.

13. The method for the mitigation of damages in case of accidental collisions, according to claim 10, wherein an emergency action to be adopted for each specific axis of the machine tool is defined in a rules table, and the emergency action includes braking, holding position, unlocking and stepping away.

14. The method for the mitigation of damages in case of accidental collisions, according to claim 10, wherein the method is implemented with a wire electric discharge machine.

15. A wire electric discharge machine comprising a computer numerical control and a plurality of axes, wherein the computer numerical control is configured to conduct the method according claim 1.

* * * * *